R. J. MILLER & J. BELL.
DIRECTION INDICATOR FOR AUTOMOBILES.
APPLICATION FILED AUG. 9, 1916.
1,224,657.
Patented May 1, 1917.
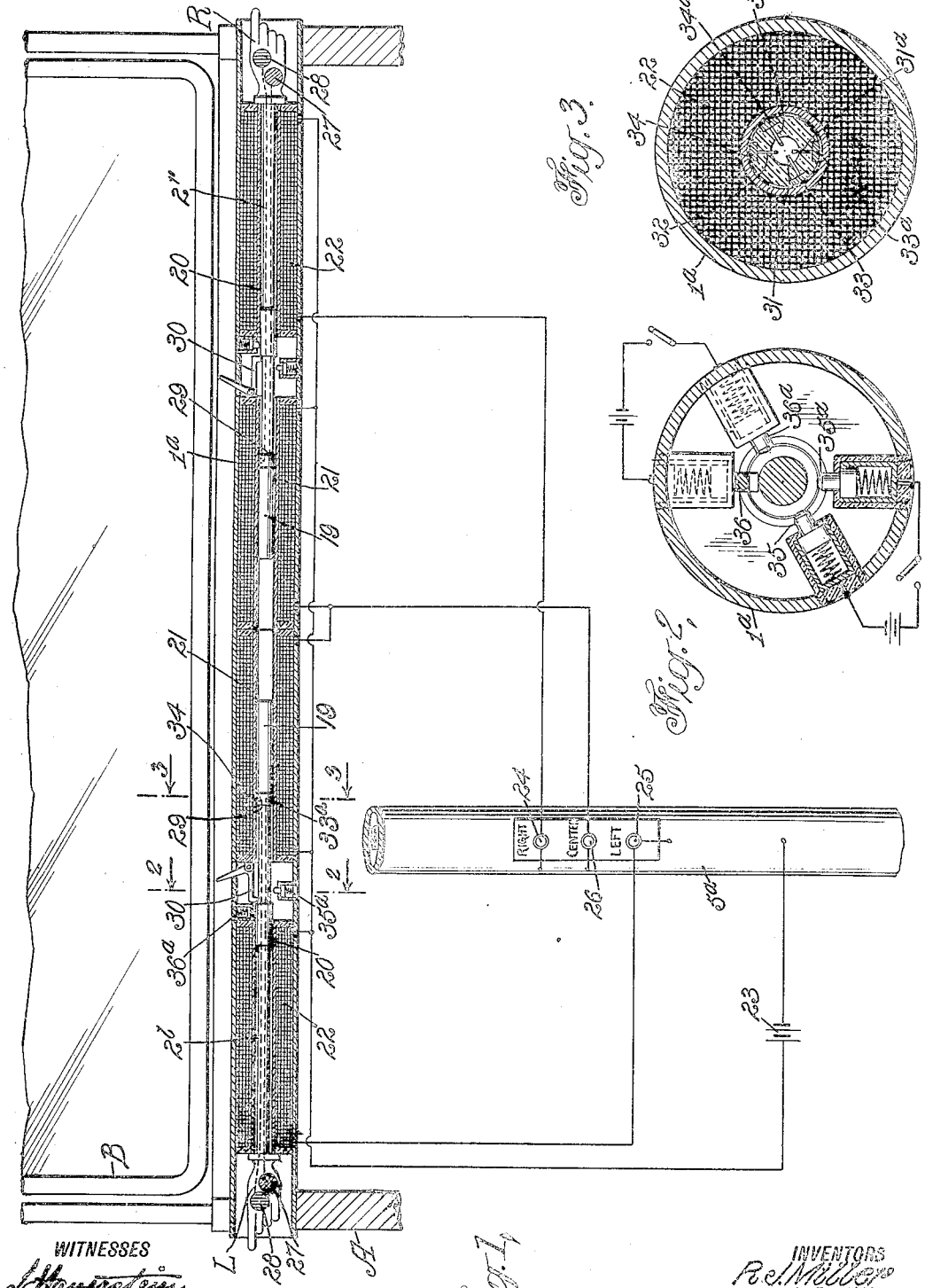

UNITED STATES PATENT OFFICE.

ROMAN J. MILLER AND JOHN BELL, OF BREMERTON, WASHINGTON.

DIRECTION-INDICATOR FOR AUTOMOBILES.

1,224,657. Specification of Letters Patent. Patented May 1, 1917.

Application filed August 9, 1916. Serial No. 113,862.

*To all whom it may concern:*

Be it known that we, ROMAN J. MILLER and JOHN BELL, citizens of the United States, and residents of Bremerton, in the county of Kitsap and State of Washington, have invented a new and Improved Direction-Indicator for Automobiles, of which the following is a full, clear, and exact description.

This invention relates to a safety signal for automobiles, of that type known as a direction indicator for giving a warning as to the direction of turning or the stoppage of an automobile to the drivers of other automobiles or to pedestrians, whereby accidents can be avoided and the driving of a car rendered safe and nervous strain and worry on the part of the driver minimized.

More particularly the invention relates to a direction indicator of that type including a pointing hand safety signal of that type in which a hand is projected from either or both sides of an automobile to indicate the direction in which the car is turned or that the car is standing still, the hands being illuminated by night by providing electric bulbs thereon, the apparatus being of comparatively simple and inexpensive construction, reliable and efficient in use, and so designed as to be readily operated.

The object of the invention is the provision of a projectable signal element which has two ranges of movement, and when the element is moved through its first range a green lamp will be lighted to indicate the direction of turning, and when the element is moved throughout its complete range, a red lamp will be lighted to indicate that the car is standing, it being preferable to project the elements from both sides of the car so that two red lights will be observed from in front and three red lights from the rear, the third light being the tail lamp, so that when the car is stopped in a dark place, as on a country road, other drivers will be warned as to the exact position of the standing automobile and the clearance around the same.

With such object in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a combined sectional and diagrammatic view of a form of the device, whereby green direction-indicating lamps are lighted, as in turning, or red lamps are lighted, as when the car is stopped; and Figs. 2 and 3 are transverse sectional views respectively on the lines 2—2 and 3—3, Fig. 1.

Referring to the drawing, the right and left indicating hands R and L respectively are connected with independent bars $2^r$ and $2^l$ and to each of these bars is attached a pair of solenoid cores 19 and 20, which lie respectively within the solenoids 21 and 22. The outermost solenoids serve to project the hands, while the inner solenoids serve to retract them. The solenoids when energized act on their respective cores to move the rods $2^r$ or $2^l$ longitudinally within the casing $1^a$ in which the solenoids are mounted. The solenoids are connected in circuit with a source of current 23, and the right solenoid 22 is controlled by a pushbutton 24, and the left solenoid 22 is connected by a pushbutton 25. The inner solenoids 21 are controlled by a pushbutton 26. These pushbuttons are mounted at any suitable point, as for instance, the steering column $5^a$. In the hands, or carried thereby, are green and red lamps 27 and 28. The green lamps are lighted for indicating the direction in which the car is to be turned, while the red lamps are lighted to indicate that the car is standing. For throwing the two sets of lamps into and out of circuit the bars $2^r$ and $2^l$ move outwardly to two different positions. The first position is determined by means of a shoulder 29 on each bar engaging a stop 30 mounted in the casing $1^a$. When the bar moves outwardly to its first position, the green light and the hand on such bar will be lighted. If the catch 30 is released or moved out of the path of the shoulder 29 when the pushbutton is pressed, the hand will move outwardly to its full extent and thereby cause the red lamp to be lighted. As shown in Fig. 7, each bar will have two sets of conductors 31, 31ª, 32, 32ª for the lamps 27, 28, respectively, and these conductors or wires connect with contacts 33, 33ª, 34, 34ª, respectively, mounted in the surface of each hand-carrying rod and insulated therefrom. These contacts are connected with an outside circuit through spring-pressed contacts 35, 35ª, 36, 36ª, mounted in the casing 1ª, as clearly shown in Figs. 1 and 2. The contacts 35, 35ª and 36, 36ª are offset from each other a short distance, and they are so related to the stops 30 that when the stops are in normal position, the contacts 35 and 35ª will engage the contacts 33 and 33ª, but when the catches are released, the contacts 34 and 34ª will move into engagement with the contacts 36 and 36ª. For the purpose of illustration, the contacts 35, 35ª and 36, 36ª are shown connected with separate sources of current in Fig. 2, but the circuit connection may be of any desired character.

It will be understood that when the car is to be turned to the right, the upper pushbutton 24 will be pressed and the right indicator R will be moved outwardly to indicating position. After the turn is made the pushbutton 26 is pressed so as to retract the hand. When the car is to be turned to the left the pushbutton 25 is pressed to thereby turn the left indicating hand L to the left. After the turn is made the center pushbutton is pressed to retract the left hand and indicator. When the car is to be stopped at night both hands are projected to their full extent, this being accomplished by releasing the stops 30 and pressing both pushbuttons 24 and 25. This will display two red lights, one at each side of the car, to thereby give the space occupied by the car, whereby the drivers of other cars will be guided in passing around the stopped car. When approached from in front, two red lights will be observed; when approached from in rear, three will be observed, since the tail light will also be seen.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention we claim as new and desire to secure by Letters Patent:

1. The combination of an automobile, with an indicator of the class described, said indicator comprising signals projectable from opposite sides, guide means for the signals, electrical means for projecting the signals independently and with a two-step movement, a lamp associated with each signal and adapted to be automatically connected in circuit when one step is completed, means for stopping the signal at the end of its step and releasable to permit the signal to move another step, and an additional lamp associated with the signal and adapted to be automatically connected in circuit when the second step is completed.

2. The combination of an automobile, with a direction indicator comprising signals movable in opposite directions beyond the side of the automobile, a guide for the signals, separate electrical devices for moving the signals to different distances outwardly, a lamp associated with each signal and adapted to be lighted automatically when the latter is moved the first distance, another lamp associated with each signal and adapted to be lighted when the latter is moved its full distance outwardly, and circuit closers for the separate electrical means.

3. The combination of an automobile, with a direction indicator comprising signals movable in opposite directions beyond the side of the automobile, a guide for the signals, separate electrical devices for moving the signals to different distances outwardly, a lamp associated with each signal and adapted to be lighted automatically when the latter is moved the first distance, another lamp associated with each signal and adapted to be lighted when the latter is moved its full distance, circuit closers for the separate electrical means, and a catch normally set for arresting the outward movement of the signals and adapted to be released to permit the signals to be moved their full distance.

ROMAN J. MILLER.
JOHN BELL.

Signed in the presence of—
C. B. WEST,
C. E. THOMAS.